United States Patent Office 3,524,738
Patented Aug. 18, 1970

3,524,738
SURFACE STRESSED MINERAL FORMED
GLASS AND METHOD
Everett F. Grubb, Toledo, Erwin C. Hagedorn, Oregon, and Joseph R. Monks, Toledo, Ohio, assignors to Owens-Illinois, Inc., a corporation of Ohio
No Drawing. Filed Dec. 7, 1965, Ser. No. 512,235
Int. Cl. C03b 3/22, 5/16, 29/00
U.S. Cl. 65—134
8 Claims

ABSTRACT OF THE DISCLOSURE

Process for making an easily melted, fast setting, readily ion exchangeable glass by forming a raw batch mixture of an alkali alumino silicate mineral (feldspar) and an alkaline earth material (dolomite), heating the raw batch mixture to form a molten glass, and cooling the molten glass to provide the above-described glass having a certain log viscosity at its liquidus temperature.

This invention relates to a process for making a novel glass, to the glass and to articles of manufacture made of the glass.

Various types of commercial glasses are manufactured. E. B. Shand on page 4 of his book entitled "Glass Engineering Handbook," Second Edition, published in 1958 by McGraw-Hill Book Company, Inc., New York, N.Y., presents the approximate compositions of commercial glasses. It can be noted on that page that there are four types of commercial glasses referred to as soda-lime glasses. These glasses are made for the manufacture of window sheet glass, plate glass, containers and electric lamp bulbs. A recent commercial development is the manufacture of a glass called float glass. It is also a soda-lime-silica glass and the composition is approximately that of a plate glass.

The main constituents of these soda-lime-silica glasses are silica ($SiO_2$), soda ($Na_2O$) and a mixture of the alkaline earth metal oxides, i.e., calcia (CaO) and magnesia (MgO). A small amount of the alkali metal oxide content may be potassia ($K_2O$). These glasses always contain a small amount of alumina ($Al_2O_3$), because some of the batch materials, particularly sand, contain a small amount of alumina. Although the maximum indicated alumina content is 2.5% by weight of the glass, some commercial glass for containers has as much as 9.5% $Al_2O_3$ by weight of the glass, when the sand of the batch material has a relatively high alumina content. Also, sometimes additional alumina in the form of soda feldspar is incorporated in the batch when the sand is rather low in alumina content, so that the glass will contain several percent of alumina because its presence decreases the rate of devitrification and provides improved durability to the glass.

The conventional batch materials for soda-lime-silica glass utilizes sand, soda ash and dolomite lime. In the reference book entitled "Handbook of the Glass Industry" compiled and edited by S. R. Scholes and published in 1941 by Ogden-Watney Publishers, Inc., New York, N.Y., a batch for container glass is presented on page 10. The tabulation indicates that borax and feldspar in minor amounts are included in the batch to provide in the glass composition a small amount of boria ($B_2O_3$) and alumina. The theoretical composition for the glass contains less than 1% of boria and alumina and ignores the alumina content in the sand and the limestone or dolomite used. Various other materials may be present in the batch to provide a fining action or to provide a desired color to the glass. These are used in very minor amounts. The color of the glass that is produced depends on whether the glasses are made under oxidizing conditions or reducing conditions. These materials are disclosed on page 13 of the reference book by Scholes.

Another commercial glass listed on page 4 in the book by Shand, mentioned above, is designated aluminosilicate glass. This glass contains on a weight basis 57% silica, 20.5% alumina and alkaline earth metal oxides, specifically 5.5% calcia and 12% magnesia, and thus it is an alkaline earth aluminosilicate. It is further indicated that this commercial glass contains 1% soda and 4% boria. On page 7 of Shand's book it is stated that aluminosilicate glass contain 20% or more of alumina and smaller amounts of calcia or magnesia, that this glass uses a relatively small amount of boria as a flux, and that a very small amount of soda or potassia is present. Such glasses are more difficult to melt and to work than borosilicate glasses. The aluminosilicate glasses are characterized by Shand as having high softening temperatures. On page 6 of his book Shand indicates that borosilicate glasses require higher melting temperatures than soda-lime-silica glasses and are generally more difficult to fabricate into articles than is the case when using soda-lime-silica glass. On page 161 of his book Shand indicates for four types of glasses the temperature that must be reached by the surface portion of the glass in a tank during melting. For the soda-lime-silica glass this temperature is indicated to be 1500° C. (2732° F.), whereas for the aluminosilicate glass it is 1600° C. (2912° F.).

As mentioned above, soda feldspar may be used in a small amount in making a container glass. It can be used as a batch material in the manufacture of the alkaline earth aluminosilicate glass; however, because of its high soda content, soda feldspar may be used only as a minor part of the source for the alumina content of this aluminosilicate glass. The main use for feldspar is as one of the raw materials for the manufacture of classic ceramics. This use is described in chapter 2 of the book entitled "Ceramics" by P. W. Lee and published in 1961 by Reinhold Publishing Corp., New York, N.Y.

P. W. Lee on pages 16 through 19 describes the various feldspars and their source along with a description of nepheline syenite which is also used in the manufacture of classic ceramics, especially white wares. The natural feldspars are indicated to be soda feldspar ($NaAlSi_3O_8$), potash feldspar ($KAlSi_3O_8$) hereinafter referred to as potassia feldspar, and lime feldspar ($CaAl_2Si_2O_8$). Nepheline syenite is indicated as comprising by weight about 50% soda feldspar (sometimes called albite), 25% potassia feldspar (sometimes called microcline or orthoclase) and 25% of the feldspathoid called nephelite or nepheline ($Na_2Al_2Si_2O_8$). Theoretical compositions of the feldspars and nephelite are presented on page 16 of the book by Lee who indicates that the feldspars used commercially are commonly intermediate in composition because the pure minerals do not occur in nature in sufficient commercial quantities. For example, potassia feldspars always contain some soda feldspars and the soda feldspars also contain some potassia feldspar. Furthermore, the feldspars used commercially contain minor amounts of silica, iron oxide and magnesia. The feldspars and the nepheline syenite are used in the manufacture of classic ceramics by serving as fluxes to provide the glassy phase of the ultimate ceramic bodies or articles.

The feldspars make up about 60% of the igneous rocks. They can intercrystallize with each other as well as form an infinite range of solid solutions among themselves so that there is a wide range of the compositions of the feldspars obtained from different deposits. Moreover, it has become common practice to regard any alkali or alkaline earth aluminosilicate mineral as a feldspar type. In this group of minerals can be included the lithium spars, such as spodumene and petalite, the feldspathoids, such as nepheine, and aplite. These can also intercrystallize among themselves and form a wide variety of solid solutions. They may also contain excesses of one or more oxides from the same family as the principal oxides of the mineral. Thus, there can be a very wide range of compositions in the ore from different deposits.

Nepheline syenite has been used as one of the components of a batch for making glass to be used in the manufacture of glass containers. This is disclosed in U.S. reissue Pat. No. 25,456 in Table I where it constitutes a minor proportion of the overall batch. The major components are sand, soda ash, and lime or dolomite. Table II of the patent shows that the alumina content for the specific glasses would be substantially less than 3% by weight. Also part of the alumina content is due to alumina impurity in the sand.

U.S. Pat. No. 2,581,638 relates to the manufacture of sheet glass. It discloses a batch in which aplite is present as one of the ingredients. However, the batch contains a large weight each of sand and soda ash, and the total weight of limestone and dolomite exceeds the weight of aplite. As a result, the alumina content of the ultimate glass is only 3.04%, as indicated.

A typical analysis of nepheline syenite on a percent by weight basis is as follows:

| | |
|---|---|
| $SiO_2$ | 60.2 |
| $Al_2O_3$ | 23.4 |
| CaO | 0.3 |
| $Na_2O$ | 10 |
| $K_2O$ | 5 |
| Iron oxide, expressed as $Fe_2O_3$ | 0.07 |
| Glass make factor | 98.7 |

Petalite is $Li_2O \cdot Al_2O_3 \cdot 8SiO_2$ which can be designated also as $LiAlSi_4O_{10}$. Commercially available petalite has been used, because of its low iron content, with silica, alumina, magnesia, titania, zircon, aluminaum metaphosphate, lithium fluoride, arsenic trioxide, and niter to make a batch for the manufacture of thermally crystallizable glass that by a controlled nucleation and crystallization is converted into a glass-ceramic. A typical analysis of this commercial petalite on a weight percent basis is as follows:

| | |
|---|---|
| $SiO_2$ | 77.7 |
| $Al_2O_3$ | 16.2 |
| $Li_2O$ | 4.2 |
| $Na_2O$ | 0.4 |
| $K_2O$ | 0.2 |
| Iron oxide, expressed as $Fe_2O_3$ | 0.03 |
| Ignition loss at 1000° C. | 1 |
| Trace impurities | |

Spodumene is $Li_2O \cdot Al_2O_3 \cdot 4SiO_2$ which is also designated as being $LiAlSi_2O_6$. For this mineral, ignoring impurities, spodumene contains on a weight basis 64.6% $SiO_2$, 27.4% $Al_2O_3$ and 8% $Li_2O$. Commercially available spodumene had the following typical analysis on a weight percent basis:

| | |
|---|---|
| $SiO_2$ | 63.4 |
| $Al_2O_3$ | 26.2 |
| $Li_2O$ | 7.4 |
| $Na_2O$ | 1.0 |
| $K_2O$ | 0.7 |
| Iron oxide, expressed as $Fe_2O_3$ | 0.7 |
| Manganese, expressed as MnO | 0.2 |
| CaO+MgO | 0.5 |
| Ignition loss at 1000° C. | 0.3 |

Aplite is commercially available in a low iron content form, which is suitable for use in the batch for making flint container glass, and in a high iron content form, which is suitable for use in the batch for making colored container glass. These forms of aplite have the following typical analyses on a weight percent basis:

| | Low iron | High iron |
|---|---|---|
| $SiO_2$ | 64.4 | 61.1 |
| $Al_2O_3$ | 20.9 | 23.2 |
| $Na_2O$ | 5.4 | 6.0 |
| $K_2O$ | 2.7 | 2.7 |
| CaO oxide | 5.3 | 5.6 |
| Iron expressed as $Fe_2O_3$ | 0.1 | 0.4 |
| $TiO_2$ | 0.2 | 0.2 |
| Chromium oxide expressed as $Cr_2O_3$ | 0.0002 | 0.0001 |
| Ignition loss at 1000° C. | 0.9 | 0.7 |

In the U.S. patent application Ser. No. 181,887 on which French Pat. No. 1,329,124 and South African Pat. No. 62/2353 are based in part it is stated that sodium aluminosilicate glasses must contain at least 5% alumina by weight for the glass, after being subjected to an ion exchange treatment for replacement of sodium ions in the surface layer with potassium ions, to have an increased flexural strength or modulus of rupture that will be substantially retained after considerable abrasion of the glass surface. These sodium aluminosilicate glasses are stated as consisting essentially of, on a weight basis, at least 5% $Na_2O$, at least 5% $Al_2O_3$, and the balance being $SiO_2$, but optionally up to about 15% of other compatible glass-forming ingredients may be present. It is further stated that such glasses in which either the $Na_2O$ or $Al_2O_3$ content is above about 25% are generally too low in chemical durability and/or too difficult to melt to be of practical interest. Also it is stated that, as either the $Na_2O$ or $Al_2O_3$ content is decreased, the degree of strengthening within a given time diminishes and thus their combined content should ordinarily not be less than about 15% if substantial abraded strength is to be imparted to the glass by the ion exchange of potassium for sodium in the surface layer of the glass. It is preferred that the $Na_2O$ content be at least 15% by weight and the $Na_2O$ content be about 15–16% as optimum.

U.S. patent application Ser. No. 181,887 states that, whereas a substantial increase in abraded strength of a sodium aluminosilicate glass may be observed by effecting a given amount of ion exchange to a given depth, the same is not true for an equal or even greater degree of ion exchange in a soda-lime-silica glass. The patent application further states that with a sodium aluminosilicate glass having an alumina content of less than 10% by weight the rate of ion exchange and sodium replacement becomes too low to be of interest, whereas when the alumina content is increased the sodium ion replacement increases so that the depth of the ion-exchanged surface layer increases at a proportionally greater rate. For this reason, the application states that preferably the alumina content is maintained between 16% and 22% by weight. It further indicates that other compatible metal oxides may be incorporated for secondary purposes and may be tolerated in minor amounts. Thus, in general, the total of alkaline earth metal oxides, particularly CaO and MgO, should not exceed 5% by weight and preferably should be no greater than 2–3% by weight based on their total content in the glass.

Conventional soda-lime-silica batch for the manufacture of glass containers, for example, begins to melt at about 800° C. (about 1472° F.). Long after melting begins and even after the batch reaches the desired maximum temperature required for complete melting and reaction for molten glass formation, there is a considerable evolution of gas. This effect requires a substantial period of time to remove the gas bubbles in the fining operation.

As indicated above, alkaline earth aluminosilicate glasses require a fairly high temperature for melting a batch to form this glass and thus either special refractories in the furnace are required or a short life of the furnace lining results.

It is an object of the present invention to provide a process for making glass and products or articles of manufacture from the glass so that the glass in the molten form has improved characteristics or properties as compared with conventional soda-lime-silica glasses and with conventional alkaline earth aluminosilicates.

It is another object of this invention to provide a process for making glass that can be ion exchanged to provide a substantial increase in strength which is retained after an abrasion to a greater extent than is the case with ion-exchanged conventional soda-lime-silica glasses.

Still another object of the invention is to provide a process for making a glass that is more readily ion exchanged than conventional soda-lime-silica glass and is similar in the case of ion exchangeability to those glass compositions that are high in alumina and soda content, i.e., sodium aluminosilicates, and are devoid of or contain at best a very low content of alkaline earth metal oxide such as described in U.S. application Ser. No. 181,887, as mentioned above.

A further object of this invention is to provide a process for making a glass from a novel batch composition so that the viscosity-temperature relationship and other characteristics of the glass are more desirable than conventional alkaline earth aluminosilicates and at least as good in working characteristics, as a result of the viscosity-temperature characteristics, as conventional soda-lime-silica glasses.

Other objects of the present invention are the glass compositions resulting from the process of the present invention and the articles of manufacture obtained from these glasses especially by the use of conventional automatic machinery, such as that used for press forming and for molding by either the press-and-blow technique or the blow-and-blow technique, as well as that used for the manufacture of other articles such as glass tubing and rod, plate glass, sheet glass, float glass and glass for electric lamp bulbs.

These and other objects of the present invention will be apparent to one skilled in the art from the description that follows.

The invention, expressed as the process embodiment, is melting and reacting, to form a glass, a mixture consisting essentially of at least one alkali aluminosilicate mineral as a major ingredient and at least one alkaline earth material selected from the group consisting of alkaline earth metal oxide, alkaline earth metal carbonate and alkaline earth aluminosilicate mineral as a minor ingredient, preferably said alkali aluminosilicate mineral major ingredient containing a substantial soda content and said alkaline earth material containing a substantial content of calcia, magnesia or total magnesia and calcia, whereby the glass that is formed has the theoretical composition expressed below. Accordingly, the mixture can contain at least one (1) alkali feldspars such as soda feldspar, potassia feldspar, and feldspars that are considered as containing both soda and potassia feldspars (such as soda orthoclase and anorthoclase described by Lee on pages 16 and 17 in his book mentioned above), nepheline syenite, (3) nepheline, (4) aplite, and (5) lithium spars, such as spodumene and petalite. The choice of these alkali aluminosilicate minerals to make a specific glass within the present invention is dependent upon where it is desired to make a glass in which the alkali metal is primarily or entirely sodium, lithium or potassium. It is preferred that the mineral or minerals to be used provide sodium as the predominant alkali metal in the glass, although as seen below in examples of the glasses of the invention substantial potassium expressed as $K_2O$ can be present in this preferred embodiment. When it is desired to ion exchange the glass, as explained in more detail later, to replace one alkali metal ion by another alkali metal ion having a larger or smaller ionic diameter, the initial mole content in the glass of the replacing alkali should be substantially less, e.g., less than 75%, of the mole content of the alkali metal ion to be replaced. Also, in the preferred embodiment, when the glass and articles therefrom are not later ion exchanged but it is desired to provide a glass containing soda although potassia may be present, the soda: potassia content on a weight basis is less than 1:1, such as a maximum of 0.75:1. In this case, nepheline syenite and certain feldspars available in the United States, e.g., Spruce Pine feldspar and Western feldspar, can be used. As seen from the typical analysis of nepheline syenite presented above and these two feldspars presented below, this requirement is met, and Western feldspar being a high-soda feldspar, has a very low $K_2O$ content. When the minor ingredient uses alkaline earth orthosilicate mineral, it is preferably only a partial replacement for alkali earth metal oxide or alkaline earth metal carbonate or mixture of oxide and carbonate.

The mixture of batch material used in the process of the present invention may contain minor amounts of other compatible materials, such as fining agents and the colorant metal oxides, the latter usually being incorporated in glass for the purpose of providing a specific color to the glass or for providing specific light absorption characteristics. The total amount of such other materials in the batch mixture is a maximum of 5% by weight of the total weight of said major and minor ingredients other than the weight in the batch of the $CO_2$ content in the mixture when carbonate is used to provide at least part of the alkaline earth metal oxide content.

In view of the fact that the alkali aluminosilicate minerals and any alkaline earth aluminosilicate minerals used in the batch of the present invention will generally contain an amount of iron oxide impurity so that the resultant glass has a color, and thus is not suitable as a flint glass, the present invention is more suited to the manufacture of colored glasses and articles of such glasses.

In view of the foregoing, the batch of the present invention consists essentially on a weight basis of about 55% to about 90% alkali aluminosilicate mineral and about 10% to about 45% of an alkaline earth material as oxide, carbonate and aluminosilicate mineral or mixtures thereof, said carbonate being used to provide said weight percent of oxide, in which the alkaline earth is calcia, magnesia and mixtures thereof. When none of the alkaline earth material is an alkaline earth aluminosilicate, the batch consists essentially on a weight basis of about 75% to about 90%, preferably about 80 to about 95%, alkali aluminosilicate mineral and about 10% to about 25%, preferably about 10% to about 20%, alkaline earth material. As stated above, the alkali aluminosilicate mineral or mixture of such minerals has in the preferred glass a greater soda than potassia weight content.

The preferred glasses of this invention resulting from the melting and reacting of the batch mixture of raw materials, as expressed above, have the following theoretical composition expressed in ranges on a weight percent basis, wherein the glasses consist essentially of expressed oxides and any compatible materials present are limited to 5% by weight of the total content of oxides expressed below:

| Oxide composition | General range | Preferred range | Especially preferred range |
| --- | --- | --- | --- |
| $SiO_2$ | 43-63 | 51-63 | 54-63 |
| $Al_2O_3$ | 14-25 | 15-22 | 17-22 |
| CaO | 0-30 | | |
| MgO | 0-20 | | |
| Total CaO and MgO, expressed as CaO | 10-30 | 10-22 | 10-12 |
| $Na_2O$ | 3.5-10 | | |
| $K_2O$ | 0-5 | | |
| Total $Na_2O$ and $K_2O$, expressed as $Na_2O$ | 5-15 | 7-14 | 8-13 |

However, being within these general ranges does not provide a glass having suitable working characteristics etc. Accordingly, an additional limitation is the log viscosity at the liquidus temperature of the glass, i.e., the logarithm (to the base 10) of the viscosityinpoisesatthetem temperature shall be at least 2.3, and preferably at least 3.4 and it is especially preferred that it be at least 4. For this reason there are presented above preferred ranges and especially preferred ranges for the oxides of the composition, but again being within these ranges does not necessarily give a glass with the minimum log viscosity at the liquidus that is desired.

The preferred glass of the present invention, as will be apparent from Table I that is presented later, has the following typical properties that are obtained by the proper choice of the specific weight percent of the raw or batch materials:

Typical properties:
  Liquidus (° F.) _____ 2035–2320
  Log viscosity at liquidus _____ at least 2.3
Log Viscosity:
  Of 2 at ° F. _____ 2345–3080
  Of 3 at ° F. _____ 2065–2600
  Of 7 at ° F. _____ 1521–1736
Cooling time—Sec. _____ 55–68
Thermal expansion $\alpha \times 10^7$ (0–300° C.) __ 66–88.5

These glasses have cooling times that are substantially below the cooling time of the conventional soda-lime-silica glass for which an average value is 96 seconds. The term "cooling time" is used as a yardstick to compare the potential working properties of a glass with those of other glasses. To obtain a cooling time, the temperatures, at which a glass has a log viscosity in poises of 3 and a temperature having a log viscosity in poises of 7, are used as the limits of the forming range. As a glass is cooled from the temperature at which its viscosity is suitable for working, the sooner it reaches a temperature at which it has a viscosity at which the article will not sag, the shorter is the time that it should be retained in a mold for most efficient use of the mold. Thus, the shorter the cooling time the faster can be the rate at which the glass articles are made. The term "setting rate" is a term that is used as an equivalent for the term "cooling time."

During the past 25 years glass compositions for the manufacture of glass containers have become faster and faster setting glasses. The cooling times have been reduced from about 108 to 96 seconds, and automatic machinery speeds have increased with these decreases in cooling time. Accordingly, from this standpoint the glasses of the present invention are a continuation of this desirability of reduction in cooling time of glass used for automatic machinery manufacture of glass articles such as glass containers. For the maximum utilization of the cooling time characteristic of the glasses of this invention, it would be desirable to develop new automatic machinery that can utilize the higher setting speeds of the compositions of this invention. This does not imply that present equipment is not suitable for the manufacture of articles such as bottles using glasses of the invention. As a matter of fact, two compositions have been used to form suitable bottles on a single IS machine used for development work. Although one of them was so fluid at temperatures down to the devitrification point, this glass was puddled into the blank and then the conventional procedure was followed for the manufacture of the containers. The other glass composition was successfully used to form 500 glass containers by using a temperature about 150° F. lower, from a viscosity standpoint, than that used for the conventional soda-lime-silica glass used in this development machine for the studies of improved construction of the machine. It is believed further, that by changing the orifice ring size of the feeder for this machine, higher glass temperatures could have been used and this composition would be expected to be useful with the standard feeder and the standard bottle-forming machines with their conventional operating conditions, at least with better cooling of the mold equipment.

Five hundred suitable containers were made in the following manner. A glass melting tank lined with conventional zircon refractory was used to make glass from an approximately 1600-pound batch having the following ingredients:

|  | Lbs. |
|---|---|
| Spruce Pine feldspar [1] | 1328.0 |
| Raw dolomite limestone [2] | 520.0 |
| Arsenic trioxide [3] | 4.0 |
| Niter [4] | 4.0 |
| Sodium antimonate [5] | 4.8 |

[1] The analysis of this feldspar, on a weight percent basis, is as follows:

| $SiO_2$ | 68 |
|---|---|
| $Al_2O_3$ | 18.9 |
| CaO | 1.6 |
| MgO | 0.1 |
| $Na_2O$ | 6.7 |
| $K_2O$ | 4.7 |
| Iron expressed as $Fe_2O_3$ | 0.07 |
| $P_2O_5$ | 0.0004 |
| Chromium expressed as $Cr_2O_3$ | 0.0004 |

The glass made factor is 99.9%.

[2] The analysis of this material on a weight percent basis is as follows:

| $SiO_2$ | 0.5 |
|---|---|
| $Al_2O_3$ | 0.1 |
| $Fe_2O_3$ | 0.072 |
| $P_2O_5$ | 0.023 |
| $SO_3$ | 0.04 |
| CaO | 30.4 |
| MgO | 21.5 |

The glass made factor is 52.6%, as the rest is $CO_2$ of the carbonate.

[3] Used as a fining agent.
[4] Used as an oxidizing agent.
[5] Used as a fining agent.

This glass has a liquidus of 2245° F. and a log 4 viscosity of 2060° F. The theoretical glass composition on a weight percent basis, is as follows:

| $SiO_2$ | 56.4 |
|---|---|
| $Al_2O_3$ | 15.6 |
| CaO | 11.6 |
| MgO | 6.9 |
| $Na_2O$ | 5.5 |
| $K_2O$ | 3.7 |
| $As_2O_3$ | 0.25 |
| $Sb_2O_3$ | 0.23 |
| $Fe_2O_3$ | 0.09 |

To make this glass the furnace was preheated to 1350° F. and then the main burners were fired. The batch was charged at the rate of 200 lbs./per hr. About three hours later glass to a depth of six inches was present in the melter. The charging of batch was ceased until the batch now in the melter became completely molten. Then the charging of the batch was restarted at a rate of about 150 lbs./per hr. When molten glass came through the orifice a pull rate of 70 lbs./per hr. was maintained. Eventually the desired glass depth of about 11 inches in the melter was reached. The charger was switched to automatic control. The glass in the melter was found radiamatically to have a temperature of 2725° F. The glass in the refiner was at 2300° F. and in the bowl of the feeder was at 2200° F., while the emerging stream of glass from the orifice was at 2190° F. The glass devitrified when the stream on cooling reached 2170° F. The pull rate was reduced to 50 lbs./per hr. As a result, the emerging glass stream was at 2210° F. and parisons were formed, but the glass set too fast to reshape the parison in the blank mold.

Instead of the expected liquidus of 2245° F. and log 4 viscosity of 2060° F., the liquidus was 2300° F. and the log 4 viscosity was 2025° F. It was believed that the parisons could be formed into glass containers by the addition of a large amount of heat to the blank molds, but it was decided to change the glass composition. To accomplish this, the tank was drained until only six inches of molten glass remained in the tank. A new approximately 1600-pound batch having the following ingredients was charged to the tank at about 300 lbs./per hr. while glass was pulled at about 90 lbs./per hr. until the desired glass level was reached.

| Ingredients: | Weight, pounds |
|---|---|
| Spruce Pine feldspar [1] | 1328.0 |
| Raw dolomite limestone [2] | 260.0 |
| Arsenic trioxide [3] | 4.0 |
| Niter [4] | 4.0 |
| Sodium antimonate [5] | 4.0 |
| High-calcite Mississippi limestone [6] | 245.0 |

[1-5] See notes above for previous batch for items 1 through 5.
[6] This limestone had the following composition in percent by weight:

| | |
|---|---|
| CaO | 55.3 |
| MgO | 0.4 |
| $SiO_2$ | 0.4 |
| $Al_2O_3$ | 0.04 |
| $Fe_2O_3$ | 0.046 |
| $SO_3$ | 0.03 |
| $P_2O_5$ | 0.008 |
| $Cr_2O_3$ | 0.004 |

The theoretical composition of this glass in percent by weight is as follows:

| | |
|---|---|
| $SiO_2$ | 56.3 |
| $Al_2O_3$ | 15.6 |
| CaO | 14.8 |
| $Na_2O$ | 5.5 |
| $K_2O$ | 3.7 |
| MgO | 3.5 |
| $As_2O_3$ | 0.25 |
| $Sb_2O_3$ | 0.23 |
| $Fe_2O_3$ | 0.08 |

Later the pull was reduced to 75 lbs./per hr. The pull was not reduced further because it was being used to change the composition in the tank, and fining of the glass was not the immediate objective. The temperature in the feeder bowl and in the refiner were reduced, and eventually the pull rate was reduced to about 25 lbs./per hr. in order to aid refining of the glass. When the glass had been refined fairly well, the production of the 500 sample containers (GB–2000 bottles) was started with a refining temperature of 2300° F., a bowl temperature of 2230° F. and a stream temperature of 2180° F. Four bottles per minute were made, and these were satisfactory except when external heating being applied to the blank mold was removed. The desired 500 bottles were obtained satisfactorily and the experimental production was ceased. At the end of the operation the glass being pulled did not have the composition of the modified composition indicated above. Rather, it was between it and the first composition. The liquidus temperature of the pulled glass was 2255° F. which was adequate to permit a gob to be formed without devitrification.

A number of glasses of the preferred type of the present invention were prepared along with a number of glasses that do not have the properties required, and all of these were made using Spruce Pine feldspar, nepheline syenite or Western feldspar as the alkali aluminosilicate and high-calcite Mississippi limestone, raw dolomite lime and mixture of these limes as the alkaline earth material. All of the glasses were made by melting the mixture of batch ingredients in platinum crucibles at a temperature of 2700 to 2800° F. The time at the melting temperature was about 18 to 20 hours from the time that the last of a batch mixture was added to the crucible. The platinum crucibles were kept at this temperature for melting the glass by being placed in either a gas-fired furnace or an electric furnace. There was no difference as to the type of furnace with regard to the quality of the final glass.

The batch contained sufficient high-calcite Mississippi limestone to provide a specific amount of calcite lime, in view of the fact that the limestone is the carbonate and the lime is the oxide. Similarly, the amount of raw dolomite limestone was chosen to provide a specific weight percent of dolomite lime. The analyses of these limestones have been presented above.

The analysis of the nepheline syenite used is presented above. A typical analysis of Spruce Pine feldspar on a weight percent basis is as follows:

| | |
|---|---|
| $SiO_2$ | 68 |
| $Al_2O_3$ | 18.9 |
| $Fe_2O_3$ | 0.07 |
| CaO | 1.6 |
| MgO | 0.1 |
| Chromium oxide expressed, as $Cr_2O_3$ | 0.0004 |
| $P_2O_5$ | 0.004 |
| $Na_2O$ | 6.7 |
| $K_2O$ | 4.5 |

Glass made factor 99.87%.

The Western feldspar has a typical analysis on a weight percent basis as follows:

| | |
|---|---|
| $SiO_2$ | 68.8 |
| $Al_2O_3$ | 19.1 |
| Iron oxide expressed as $Fe_2O_3$ | 0.146 |
| CaO | 0.3 |
| $Na_2O$ | 10.4 |
| $K_2O$ | 0.6 |
| Chromium oxide expressed, as $Cr_2O_3$ | 0.0003 |
| $P_2O_5$ | 0.064 |

Glass made factor 99.4%.

The liquidus temperature is a term that has a well known meaning in the art and need not be defined. The coefficient of expansion is another property indicated, and its meaning is stated at the end of Table I. The chemical durability of the glass is expressed as numerical values where such durability has been indicated. The specific tests have no absolute commercial meaning and cannot be exactly correlated with the chemical resistance of glassware under particular service conditions. However, the lower the value for a glass, the more likely it is that the products made of this glass will be more resistant to such liquid environment than a glass having a higher value in the durability test. In Table I most of the compositions are presented based on theoretical values in view of the known compositions of the batch ingredients. Thirteen of the glasses were analyzed. A comparison of the actual versus theoretical oxide compositions indicated satisfactory agreement between the two sets of values. Analyzed compositions are distinguished by means of the asterisk for the silica content.

For comparison, a typical amber container glass has a liquidus of 1900° F. and log viscosities of 2, 3 and 7 at 2670, 2185 and 1405° F., respectively. The percent $Na_2O$ dissolved in chemical durability tests using $H_2O$ and N/50 $H_2SO_4$ were 0.027 and 0.032, respectively.

TABLE I

| | Example | | | | |
|---|---|---|---|---|---|
| | 1 | 2 | 3 | 4 | 5 |
| Oxide composition, wt. percent: | | | | | |
| $SiO_2$ | 48.22 | 54.44 | 58.32 | [1] 61.22 | [1] 57.94 |
| $Al_2O_3$ | 13.38 | 15.13 | 15.97 | 16.57 | 16.34 |
| CaO | 30.23 | 21.24 | 16.03 | 11.67 | 14.30 |
| MgO | 0.22 | 0.18 | 0.16 | 0.04 | 1.33 |
| $Na_2O$ | 4.72 | 5.35 | 6.14 | 6.11 | 5.96 |
| $K_2O$ | 3.17 | 3.59 | 3.32 | 4.08 | 4.00 |
| $Fe_2O_3$ | 0.06 | 0.07 | 0.06 | 0.07 | 0.11 |
| Liquidus, ° F. | 2,400 | 2,320 | 2,285 | 2,245 | 2,200 |
| Log vis. at liquidus | 2.00 | 2.80 | 3.29 | 6.12 | 3.61 |
| Log vis. at ° F.: | | | | | |
| 2 | 2,400 | 2,615 | 2,850 | 3,080 | 2,815 |
| 2.5 | | 2,415 | 2,585 | 2,815 | 2,570 |
| 3 | | 2,260 | 2,380 | 2,600 | 2,380 |
| 4 | | 2,025 | 2,100 | 2,280 | 2,105 |
| 5 | | 1,850 | 1,905 | 2,045 | 1,915 |
| 6 | | 1,725 | 1,770 | 1,870 | 1,775 |
| 7 | | 1,625 | 1,666 | 1,736 | 1,667 |
| 7.65 | 1,613 | 1,571 | 1,612 | 1,663 | 1,610 |
| Cooling time, sec. | | 60 | 62 | 62 | 61 |
| $\alpha \times 10^7$ (0–300° C.)[2] | 86.5 | 80.1 | 76.5 | 73.7 | [3] 76.7 |
| Batch ingredients, percent by weight: | | | | | |
| Spruce pine feldspar | 70 | 80 | 85 | 90 | 85 |
| Calcite lime | 30 | 20 | 15 | 10 | 11.25 |
| Dolomite lime | | | | | 3.75 |
| Chemical durability, percent $Na_2O$ dissolved: | | | | | |
| $H_2O$ | 0.010 | 0.007 | | 0.003 | |
| N/50 $H_2SO_4$ | 0.19 | 0.12 | | 0.037 | |

See footnotes at end of table, column 13.

TABLE I—Continued

| | Example | | | | |
|---|---|---|---|---|---|
| | 6 | 7 | 8 | 9 | 10 |
| Oxide composition, wt. percent: | | | | | |
| SiO₂ | 67.69 | 51.48 | 54.90 | 58.29 | ¹ 60.96 |
| Al₂O₃ | 13.53 | 14.11 | 15.04 | 15.97 | 17.40 |
| CaO | 24.95 | 20.71 | 16.88 | 13.03 | 9.22 |
| MgO | 6.29 | 5.27 | 4.23 | 3.19 | 1.63 |
| Na₂O | 4.67 | 5.42 | 5.78 | 6.14 | 6.26 |
| K₂O | 2.82 | 2.93 | 3.13 | 3.32 | 4.24 |
| Fe₂O₃ | 0.06 | 0.08 | 0.04 | 0.06 | 0.11 |
| Liquidus, °F | 2,295 | 2,250 | 2,160 | 2,180 | 2,175 |
| Log vis. at liquidus | 2.13 | 2.54 | 3.34 | 3.73 | 4.39 |
| Log vis. at °F.: | | | | | |
| 2 | 2,340 | 2,425 | 2,605 | 2,800 | |
| 2.5 | 2,185 | 2,260 | 2,405 | 2,570 | 2,810 |
| 3 | 2,065 | 2,130 | 2,245 | 2,385 | 2,595 |
| 4 | 1,875 | 1,925 | 2,005 | 2,115 | 2,270 |
| 5 | 1,740 | 1,780 | 1,835 | 1,920 | 2,045 |
| 6 | 1,640 | 1,670 | 1,710 | 1,780 | 1,875 |
| 7 | 1,599 | 1,582 | 1,610 | 1,668 | 1,742 |
| 7.65 | ⁴ 1,516 | 1,535 | ⁴ 1,557 | 1,608 | 1,672 |
| Cooling time, sec | 54 | 56 | 62 | 62 | 61 |
| α×10⁷ (0–300° C.)² | 80.7 | 78.9 | 75.7 | 77.8 | ³ 72. |
| Batch ingredients, percent by weight: | | | | | |
| Spruce pine feldspar | 70 | 75 | 80 | 85 | 90 |
| Calcite lime | 15 | 12.5 | 10 | 7.5 | 5 |
| Dolomite lime | 15 | 12.5 | 10 | 7.5 | 5 |
| Chemical durability, percent Na₂O dissolved: | | | | | |
| H₂O | 0.012 | | 0.007 | | 0.003 |
| N/50 H₂SO₄ | 0.19 | | 0.13 | | 0.053 |

| | Example | | | | |
|---|---|---|---|---|---|
| | 11 | 12 | 13 | 14 | 15 |
| Oxide composition, wt. percent: | | | | | |
| SiO₂ | 51.50 | 54.86 | ¹ 58.76 | 40.87 | 47.66 |
| Al₂O₃ | 14.11 | 15.04 | 14.15 | 11.40 | 13.28 |
| CaO | 18.21 | 14.88 | 10.60 | 24.42 | 18.72 |
| MgO | 7.79 | 6.26 | 3.18 | 16.54 | 12.44 |
| Na₂O | 5.42 | 5.78 | 8.59 | 4.01 | 4.68 |
| K₂O | 2.93 | 3.13 | 4.24 | 2.69 | 3.15 |
| Fe₂O₃ | 0.04 | 0.05 | 0.08 | 0.07 | 0.07 |
| Liquidus, °F | 2,195 | 2,295 | 2,100 | 2,390 | 2,315 |
| Log vis. at liquidus | 1.68 | 2.90 | 3.88 | 1.22 | 2.0 |
| Log vis. at °F.: | | | | | |
| 2 | 2,410 | 2,610 | 2,750 | 2,135 | 2,300 |
| 2.5 | 2,245 | 2,420 | 2,525 | 2,015 | 2,160 |
| 3 | 2,115 | 2,265 | 2,345 | 1,920 | 2,050 |
| 4 | 1,915 | 2,040 | 2,075 | 1,770 | 1,900 |
| 5 | 1,775 | 1,875 | 1,880 | 1,665 | 1,795 |
| 6 | 1,665 | 1,750 | 1,735 | 1,585 | 1,715 |
| 7 | 1,580 | 1,653 | 1,624 | 1,529 | 1,660 |
| 7.65 | 1,534 | 1,600 | 1,564 | 1,486 | 1,629 |
| Cooling time, sec | 55 | 55 | 67 | 48 | 35 |
| α×10⁷ (0–300° C.)² | 80.7 | ³ 66.3 | ³ 83.1 | 79.8 | 78.7 |
| Batch ingredients, percent by weight: | | | | | |
| Spruce pine feldspar | 75 | 80 | 85 | 60 | 70 |
| Calcite lime | 6.25 | 5 | 3.75 | | |
| Dolomite lime | 18.75 | 15 | 11.25 | 40 | 30 |
| Chemical durability, percent Na₂O dissolved: | | | | | |
| H₂O | | | | 0.033 | 0.019 |
| N/50 H₂SO₄ | | | | (⁵) | 0.21 |

| | Example | | | |
|---|---|---|---|---|
| | 16 | 17 | 18 | 19 |
| Oxide composition, wt. percent: | | | | |
| SiO₂ | 51.45 | 54.46 | 58.26 | ¹ 61.56 |
| Al₂O₃ | 14.11 | 15.16 | 15.98 | 17.40 |
| CaO | 15.71 | 13.02 | 10.02 | 7.04 |
| MgO | 10.32 | 8.33 | 6.22 | 3.55 |
| Na₂O | 5.42 | 5.36 | 6.14 | 6.26 |
| K₂O | 2.93 | 3.60 | 3.32 | 3.95 |
| Fe₂O₃ | 0.07 | 0.07 | 0.06 | 0.11 |
| Liquidus, °F | 2,270 | 2,250 | 2,215 | 2,205 |
| Log vis. at liquidus | 2.47 | 3.0 | 3.69 | 4.31 |
| Log vis. at °F.: | | | | |
| 2 | 2,420 | 2,595 | 2,855 | 3,035 |
| 2.5 | 2,260 | 2,405 | 2,615 | 2,790 |
| 3 | 2,130 | 2,250 | 2,420 | 2,590 |
| 4 | 1,925 | 2,020 | 2,160 | 2,280 |
| 5 | 1,780 | 1,850 | 1,940 | 2,060 |
| 6 | 1,665 | 1,720 | 1,790 | 1,885 |
| 7 | 1,573 | 1,620 | 1,677 | 1,752 |
| 7.65 | 1,523 | 1,565 | 1,615 | 1,679 |
| Cooling time, sec | 58 | 60 | 63 | 58 |
| α×10⁷ (0–300° C.)² | 74.6 | 73.0 | 71.2 | ³ 69.6 |
| Batch ingredients, percent by weight: | | | | |
| Spruce pine feldspar | 75 | 80 | 85 | 90 |
| Calcite lime | | | | |
| Dolomite lime | 25 | 20 | 15 | 10 |
| Chemical durability, percent Na₂O dissolved: | | | | |
| H₂O | | 0.007 | | 0.003 |
| N/50 H₂SO₄ | | 0.19 | | 0.057 |

| | Example | | | | |
|---|---|---|---|---|---|
| | 20 | 21 | 22 | 23 | 24 |
| Oxide composition, wt. percent: | | | | | |
| SiO₂ | 42.77 | 48.82 | 51.84 | ¹ 55.04 | ¹ 51.94 |
| Al₂O₃ | 16.57 | 18.92 | 20.12 | 20.38 | 18.87 |
| CaO | 29.73 | 19.92 | 15.01 | 10.06 | 13.38 |
| MgO | 0.21 | 0.14 | 0.08 | 0.00 | 1.68 |
| Na₂O | 7.07 | 8.08 | 8.59 | 9.56 | 9.45 |
| K₂O | 3.57 | 4.04 | 4.29 | 4.50 | 4.30 |
| Fe₂O₃ | 0.08 | 0.08 | 0.07 | 0.06 | 0.10 |
| Liquidus, °F | 2,145 | 2,255 | 2,195 | 2,140 | 2,115 |
| Log vis. at liquidus | 2.48 | 2.78 | 3.41 | 4.18 | 3.72 |
| Log vis. at °F.: | | | | | |
| 2 | 2,290 | 2,525 | 2,720 | 2,935 | 2,715 |
| 2.5 | 2,140 | 2,345 | 2,495 | 2,690 | 2,490 |
| 3 | 2,020 | 2,195 | 2,315 | 2,485 | 2,315 |
| 4 | 1,840 | 1,970 | 2,050 | 2,185 | 2,050 |
| 5 | 1,715 | 1,805 | 1,865 | 1,965 | 1,865 |
| 6 | 1,620 | 1,680 | 1,725 | 1,800 | 1,725 |
| 7 | 1,547 | 1,581 | 1,614 | 1,668 | 1,615 |
| 7.65 | 1,508 | 1,528 | 1,556 | 1,598 | 1,556 |
| Cooling time, sec | 53 | 63 | 66 | 64 | 64 |
| α×10⁷ (0–300° C.)² | 95.2 | 90.9 | ³ 88.6 | 85.2 | ³ 86.9 |
| Batch ingredients, percent by weight: | | | | | |
| Nepheline syenite | 70 | 80 | 85 | 90 | 85 |
| Calcite lime | 30 | 20 | 15 | 10 | 11.25 |
| Dolomite lime | | | | | 3.75 |
| Chemical durability, percent Na₂O dissolved: | | | | | |
| H₂O | 0.029 | 0.018 | | 0.006 | |
| N/50 H₂SO₄ | 0.21 | 0.16 | | 0.13 | |

| | Example | | | | |
|---|---|---|---|---|---|
| | 25 | 26 | 27 | 28 | 29 |
| Oxide composition, wt. percent: | | | | | |
| SiO₂ | 54.38 | 42.61 | 45.75 | 48.64 | ¹ 51.79 |
| Al₂O₃ | 21.00 | 16.36 | 17.78 | 18.69 | 20.12 |
| CaO | 9.58 | 23.86 | 19.81 | 16.03 | 12.01 |
| MgO | 0.61 | 6.25 | 5.19 | 4.17 | 3.11 |
| Na₂O | 9.76 | 7.14 | 7.58 | 8.16 | 8.59 |
| K₂O | 4.53 | 3.71 | 3.79 | 4.26 | 4.29 |
| Fe₂O₃ | 0.06 | 0.07 | 0.10 | 0.07 | 0.08 |
| Liquidus, °F | 2,035 | 2,310 | 2,275 | 2,195 | 2,090 |
| Log vis. at liquidus | 4.68 | 1.97 | 2.35 | 2.98 | 3.80 |
| Log vis. at °F.: | | | | | |
| 2 | 2,955 | 2,300 | 2,390 | 2,525 | 2,710 |
| 2.5 | 2,705 | 2,150 | 2,230 | 2,340 | 2,485 |
| 3 | 2,500 | 2,030 | 2,100 | 2,190 | 2,310 |
| 4 | 2,190 | 1,840 | 1,895 | 1,970 | 2,045 |
| 5 | 1,970 | 1,705 | 1,745 | 1,815 | 1,860 |
| 6 | 1,805 | 1,600 | 1,635 | 1,700 | 1,720 |
| 7 | 1,672 | 1,521 | 1,542 | 1,608 | 1,612 |
| 7.65 | 1,601 | 1,476 | 1,493 | 1,560 | 1,555 |
| Cooling time, sec | 68 | 58.5 | 62 | 57 | 65.5 |
| α×10⁷ (0–300° C.)² | ³ 86.6 | 90.8 | ³ 88.2 | 87.0 | ³ 86 |
| Batch ingredients, percent by weight: | | | | | |
| Nepheline syenite | 90 | 70 | 75 | 80 | 85 |
| Calcite lime | 7.5 | 15 | 12.5 | 10 | 7.5 |
| Dolomite lime | 2.5 | 15 | 12.5 | 10 | 7.5 |
| Chemical durability, percent Na₂O dissolved: | | | | | |
| H₂O | | 0.020 | | 0.010 | |
| N/50 H₂SO₄ | | 0.21 | | 0.16 | |

| | Example | | | | |
|---|---|---|---|---|---|
| | 30 | 31 | 32 | 33 | 34 |
| Oxide composition, wt. percent: | | | | | |
| SiO₂ | ¹54.26 | 42.72 | 45.75 | 48.77 | 51.80 |
| Al₂O₃ | 20.65 | 16.61 | 17.78 | 18.95 | 20.12 |
| CaO | 8.00 | 20.73 | 17.31 | 13.92 | 10.51 |
| MgO | 2.47 | 9.27 | 7.71 | 6.18 | 4.63 |
| Na₂O | 9.86 | 7.07 | 7.58 | 8.08 | 8.59 |
| K₂O | 4.53 | 3.54 | 3.79 | 4.04 | 4.29 |
| Fe₂O₃ | 0.06 | 0.06 | 0.08 | 0.06 | 0.06 |
| Liquidus, °F | 1,990 | 2,280 | 2,260 | 2,210 | 2,155 |
| Log vis. at liquidus | 4.92 | 2.0 | 2.33 | 2.87 | 3.49 |
| Log vis. at °F.: | | | | | |
| 2 | | 2,280 | 2,370 | 2,495 | 2,665 |
| 2.5 | 2,720 | 2,125 | 2,210 | 2,320 | 2,460 |
| 3 | 2,510 | 2,005 | 2,080 | 2,175 | 2,290 |
| 4 | 2,195 | 1,820 | 1,875 | 1,955 | 2,040 |
| 5 | 1,975 | 1,690 | 1,730 | 1,790 | 1,860 |
| 6 | 1,810 | 1,590 | 1,615 | 1,665 | 1,720 |
| 7 | 1,683 | 1,516 | 1,527 | 1,570 | 1,617 |
| 7.65 | 1,615 | 1,474 | 1,478 | 1,517 | 1,560 |
| Cooling time, sec | 67 | 57 | 62 | 63 | 64 |
| α×10⁷ (0–300° C.)² | ³ 85.7 | 87.3 | ³ 86.5 | 84.3 | ³ 84.3 |
| Batch ingredients, percent by weight: | | | | | |
| Nepheline syenite | 90 | 70 | 75 | 80 | 85 |
| Calcite lime | 5 | 7.5 | 6.25 | 5 | 3.75 |
| Dolomite lime | 5 | 22.5 | 18.75 | 15 | 11.25 |
| Chemical durability, percent Na₂O dissolved: | | | | | |
| H₂O | 0.006 | | | | |
| N/50 H₂SO₄ | 0.11 | | | | |

See footnotes at end of table, column 13.

TABLE I—Continued

| | Example | | | | |
|---|---|---|---|---|---|
| | 35 | 36 | 37 | 38 | 39 |
| Oxide composition, wt. percent: | | | | | |
| $SiO_2$ | 43.19 | 45.72 | 48.78 | 51.77 | 54.80 |
| $Al_2O_3$ | 15.86 | 17.78 | 18.93 | 20.13 | 21.29 |
| CaO | 17.76 | 14.81 | 11.93 | 9.00 | 6.12 |
| MgO | 12.37 | 10.24 | 8.15 | 6.14 | 4.08 |
| $Na_2O$ | 7.15 | 7.58 | 8.08 | 8.59 | 9.09 |
| $K_2O$ | 3.57 | 3.79 | 4.04 | 4.29 | 4.55 |
| $Fe_2O_3$ | 0.10 | 0.08 | 0.09 | 0.08 | 0.07 |
| Liquidus, °F | 2,290 | 2,250 | 2,215 | 2,220 | 2,060 |
| Log vis. at liquidus | 1.92 | 2.30 | 2.84 | 3.28 | 4.55 |
| Log vis. at °F.: | | | | | |
| 2 | 2,265 | 2,345 | 2,480 | 2,680 | 2,865 |
| 2.5 | 2,125 | 2,190 | 2,310 | 2,470 | 2,640 |
| 3 | 2,015 | 2,065 | 2,175 | 2,300 | 2,460 |
| 4 | 1,835 | 1,870 | 1,960 | 2,045 | 2,180 |
| 5 | 1,705 | 1,725 | 1,805 | 1,860 | 1,975 |
| 6 | 1,605 | 1,610 | 1,685 | 1,720 | 1,820 |
| 7 | 1,529 | 1,521 | 1,590 | 1,613 | 1,700 |
| 7.65 | 1,486 | 1,472 | 1,539 | 1,555 | 1,634 |
| Cooling time, sec. | 64 | 62 | 59 | 65 | 61 |
| $a \times 10^7$ (0-300° C.)[2] | 76.3 | ³85.2 | 82.6 | 81.5 | 71.4 |
| Batch ingredients, percent by weight: | | | | | |
| Nepheline syenite | 70 | 75 | 80 | 85 | 90 |
| Calcite lime | | | | | |
| Dolomite lime | 30 | 25 | 20 | 15 | 10 |
| Chemical durability, percent $Na_2O$ dissolved: | | | | | |
| $H_2O$ | 0.014 | | 0.012 | | 0.005 |
| N/50 $H_2SO_4$ | 0.23 | | 0.21 | | 0.16 |

| | Example | | | | |
|---|---|---|---|---|---|
| | 40 | 41 | 42 | 43 | 44 |
| Oxide composition, wt. percent: | | | | | |
| $SiO_2$ | 48.70 | 55.56 | ¹61.76 | 48.60 | 55.43 |
| $Al_2O_3$ | 13.48 | 15.39 | 18.15 | 13.50 | 15.38 |
| CaO | 29.73 | 19.92 | 9.72 | 23.69 | 16.04 |
| MgO | 0.21 | 0.14 | 1.11 | 6.34 | 4.25 |
| $Na_2O$ | 7.33 | 8.38 | 8.53 | 7.32 | 8.35 |
| $K_2O$ | 0.42 | 0.48 | 0.59 | 0.42 | 0.42 |
| $Fe_2O_3$ | 0.13 | 0.13 | 0.17 | 0.13 | 0.13 |
| Liquidus, °F | 2,340 | 2,290 | 2,100 | 2,285 | 2,085 |
| Log vis. at liquidus | 1.94 | 2.77 | 4.56 | 2.03 | 3.4 |
| Log vis. at °F.: | | | | | |
| 2 | 2,320 | 2,580 | 3,040 | 2,295 | 2,575 |
| 2.5 | 2,165 | 2,380 | 2,765 | 2,145 | 2,370 |
| 3 | 2,040 | 2,220 | 2,550 | 2,025 | 2,210 |
| 4 | 1,855 | 1,985 | 2,230 | 1,840 | 1,975 |
| 5 | 1,725 | 1,815 | 2,010 | 1,710 | 1,805 |
| 6 | 1,630 | 1,690 | 1,845 | 1,610 | 1,685 |
| 7 | 1,554 | 1,593 | 1,721 | 1,535 | 1,590 |
| 7.65 | 1,513 | 1,541 | 1,654 | 1,493 | 1,539 |
| Cooling time, sec. | 53 | 62 | 62 | 65 | 62 |
| $a \times 10^7$ (0-300° C.)[2] | 87.1 | 80.4 | 70.3 | 81.9 | 46.7 |
| Batch ingredients, (percent by weight): | | | | | |
| Western feldspar | 70 | 80 | 90 | 70 | 80 |
| Calcite lime | 30 | 20 | 10 | 15 | 10 |
| Dolomite lime | | | | 15 | 10 |
| Chemical durability, (percent $Na_2O$ dissolved: | | | | | |
| $H_2O$ | 0.010 | 0.007 | 0.004 | 0.010 | 0.007 |
| N/50 $H_2SO_4$ | 0.19 | 0.10 | 0.055 | 0.19 | 0.13 |

| | Example | | | | |
|---|---|---|---|---|---|
| | 45 | 46 | 47 | 48 | 49 |
| Oxide composition, wt. percent: | | | | | |
| $SiO_2$ | ¹62.12 | 55.50 | 48.74 | 55.58 | ¹61.82 |
| $Al_2O_3$ | 17.53 | 15.42 | 13.52 | 15.42 | 18.15 |
| CaO | 8.36 | 13.92 | 17.55 | 11.80 | 5.84 |
| MgO | 1.50 | 6.18 | 12.30 | 8.20 | 3.85 |
| $Na_2O$ | 9.73 | 8.38 | 7.33 | 8.38 | 9.44 |
| $K_2O$ | 0.59 | 0.48 | 0.42 | 0.48 | 0.59 |
| $Fe_2O_3$ | 0.16 | 0.12 | 0.14 | 0.15 | 0.18 |
| Liquidus, °F | 2,120 | 2,200 | 2,290 | 2,160 | 2,200 |
| Log vis. at liquidus | 4.43 | 3.0 | 1.94 | 3.14 | 4.19 |
| Log vis. at °F.: | | | | | |
| 2 | | 2,535 | 2,270 | 2,525 | 3,065 |
| 2.5 | 2,785 | 2,350 | 2,130 | 2,345 | 2,785 |
| 3 | 2,560 | 2,200 | 2,010 | 2,195 | 2,590 |
| 4 | 2,230 | 1,975 | 1,835 | 1,975 | 2,250 |
| 5 | 2,000 | 1,820 | 1,710 | 1,810 | 2,020 |
| 6 | 1,830 | 1,705 | 1,610 | 1,685 | 1,855 |
| 7 | 1,697 | 1,614 | 1,534 | 1,590 | 1,725 |
| 7.65 | 1,627 | 1,566 | 1,493 | 1,538 | 1,656 |
| Cooling time, sec. | 66 | 56.5 | 54 | 60 | 62 |
| $a \times 10^7$ (0-300° C.)[2] | 73.2 | 75.1 | 76.6 | 73.3 | 70.0 |
| Batch ingredients, percent by weight: | | | | | |
| Western feldspar | 90 | 80 | 70 | 80 | 90 |
| Calcite lime | 5 | 5 | | | |
| Dolomite lime | 5 | 15 | 30 | 20 | 10 |
| Chemical durability, percent $Na_2O$ dissolved: | | | | | |
| $H_2O$ | 0.003 | | 0.024 | 0.10 | 0.004 |
| N/50 $H_2SO_4$ | 0.036 | | 0.22 | 0.21 | 0.051 |

[1] Analyzed—All others theoretical.
[2] a means the average coefficient of lineal thermal expansion per °C., e.g., glass of Example I has an average coefficient of 86.5×10⁻⁷/°C. over the range from 0°C. to 300°C.
[3] Measured—All others calculated.
[4] Fiber devitrified.
[5] Neutral.

It will be apparent from a comparison of the values expressed in Table I that some of the ranges of ingredients for the compositions of the present invention can be met by specific example glasses which are actually examples of those glasses not suitable and not part of the present invention. For example, glass No. 31 falls within the general ranges of the preferred glass of the present invention in all respects, considering that the silica content of 42.72% is substantially 43%, the lower end of the general range. However, it is to be noted that the log viscosity at the liquidus temperature is lower than the minimum required end, of course, much lower than the minimum required for the preferred glass, which is a value of at least 3.4, as expressed above. In view of the foregoing general range, preferred range and especially preferred range for the compositions and the minimum log viscosity at the liquidus of 2.3, 3.4 and 4, respectively, glass numbers 1, 6, 14, 15, 26, 31, 35, 40, 43 and 47 are outside the scope of the glass of the preferred embodiment. Glass numbers 4, 10, 19, 23, 25, 30, 39, 42, 45 and 49 are examples of glasses in the especially preferred range. The glasses numbers 5, 9, 13, 18, 22, 24, 29, 34 and 44 are examples of glasses of the preferred range but lacking properties to meet the requirements of the especially preferred range. The glasses not mentioned by number in the foregoing comments meet only the requirements of the general range.

The chemical durability tests were obtained by crushing a glass sample to provide a quantity of crushed glass that passes through a No. 40 sieve and is retained on a No. 50 sieve. Exactly 10 grams of the crushed sample of glass is placed in a 200-mil. Erlenmeyer borosilicate flask that had been previously aged with the attacking liquid medium for at least 24 hours at at least 90° C. Exactly 50 ml. of the attacking liquid medium, either purified water or 0.02 N $H_2SO_4$ aqueous solution, was added. The flask, after being stoppered with a one-hole rubber stopper equipped with a 12-inch length of 3/16-inch chemically resistant glass tubing, was immersed in a water bath held at 90° C. (within 0.2° C.) for 4 hours. Then the flask and its contents were cooled by running tap water on the outside of the flask. Exactly 40 ml. of the aqueous extracting medium in the flask is transferred to another flask.

When the attacking medium is water, the transferred solution is titrated with 0.02 N $H_2SO_4$ to an excess of 1 ml. using two drops of methyl red indicator that are added prior to the starting of the titration. Then the flask is heated to boil the contents and swirled. This is repeated three times to remove all dissolved gasses. Thereafter the solution is titrated with 0.02 N NaOH with methyl red to its end point. The percent $Na_2O$ is determined by mutliplying the difference in the volume in milliliters of acid and base used in the two titrations by the factor 0.00775.

In the case of sulfuric acid as the attacking medium, to the cooled aliquot of attacking medium two drops of methyl red indicator solution is added and then the acid medium is titrated with 0.02 N NaOH to the end point. The percent $Na_2O$ removed by the attacking medium is calculated by multiplying the difference between the number of milliliters of the NaOH solution equivalent to 50 ml. of 0.02 N $H_2SO_4$ used and the number of milliliters of the NaOH solution actually used in the titration by the factor 0.0062.

An illustrative glass of the preferred embodiment of the present invention using aplite as the source of alkaline earth aluminosilicate mineral is now described. A batch containing aplite and raw dolomite limestone was melted, in a manner described above for the 49 samples, and the theoretical composition of the glass obtained is as follows:

| | |
|---|---|
| $SiO_2$ | 52.07 |
| $Al_2O_3$ | 19.76 |
| CaO | 13.94 |
| MgO | 6.24 |
| $Na_2O$ | 5.49 |
| $K_2O$ | 2.15 |
| $Fe_2O_3$ | 0.36 |

This glass has a liquidus temperature of 2195° F. with a log 4 viscosity of 2080° F. and the log viscosity at the liquidus temperature is 3.48. Its cooling time is 56 seconds, and the coefficient of lineal thermal expansion between 0 and 300° C. is $66.8 \times 10^{-7}$ per ° C.

In Table I, in the foregoing composition using aplite to make a glass, and in some earlier compositional data, the composition has shown an $Fe_2O_3$ content. Actually, this means iron oxide expressed as $Fe_2O_3$. Where the phrases "iron expressed as $Fe_2O_3$," "manganese expressed as MnO," and "chromium expressed as $Cr_2O_3$" have been used, these obviously refer not to metals but to these chemical elements as oxides, expressed as specific oxides, in the glass.

Because of the unusual batch constituents used in the glass compositions of the present invention, the melting characteristics of these compositions was investigated. The initial work was primarily limited to dolomite-feldspar mixtures corresponding to glass compositon Example No. 16 containing 25% RO from dolomite. The results reported here were generally obtained on small samples (less than one gram) heated at 10° C./min. (18° F./min.).

Below about 1190° C. (2170° F.), little or no reaction was observed between the materials; i.e. only reactions which occurred when the materials were heated by themselves were observed. The reactions of the individually heated materials are described below.

The quartz present in the feldspar undergoes the well-known polymorphic transformation at about 575° C. (1070° F.).

Small quantities of gas were evolved below 1000° C. (1830° F.). This accounts for the "ignition loss" of 0.14% for this example. Although this gas evolution has not been investigated in detail, it seems to primarily consist of $CO_2$ and $H_2O$ evolution. Based on the complex appearance of the curves, there was probably more than one reaction involved.

Melting of the feldspar began at about 1190° C. (2170° F.) and was substantially complete by about 1300° C. (2370° F.). The viscosity of the liquid formed was high so that the entrapped bubbles did not begin to rise to the surface until higher temperatures were reached. Because of the high viscosity, the initial liquid flow and bubble entrapment occurred rather slowly.

The raw dolomite began decrepitating below 400° C. (750° F.) when heated at 10° C./min. The maximum rate of decrepitation occurred at around 600° C. (1100° F.) for minus 40 mesh material.

Dissociation occurred in two stages, represented by the following equations:

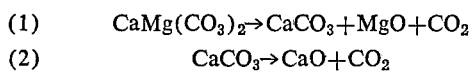

(1) $CaMg(CO_3)_2 \rightarrow CaCO_3 + MgO + CO_2$ (2) $CaCO_3 \rightarrow CaO + CO_2$ The influence of $CO_2$ partial pressure on the first stage was small. Small quantities of $CO_2$ evolution began at 320° C. (610° F.). However, the major part of the first stage of dissociation occurred between 700 and 800° C. (1300–1470° F.).

The temperature of the second stage of dissociation was strongly dependent on the $CO_2$ partial pressure. In flowing $N_2$, both stages overlapped considerably, whereas in one atmosphere of $CO_2$ the second stage did not begin until about 900° C. (1650° F.). Completion of the second stage was dependent on the experimental conditions (e.g., grain size, sample size, atmosphere and heating rate). When heated at 10° C./min. at one atmosphere pressure, the second stage was virtually complete below 100° C. (1830° F.) for most conditions.

Little reaction occurred between the dolomite and feldspar until the feldspar began to melt. As the feldspar melted, the "dolomite" (primarily MgO and CaO) was dissolved in the melt. As the sample melted, the gas present between the grains was entrapped and bubbles were formed.

A small quantity of gas appeared to be evolved from the sample in the form of bubbles as the "dolomite" went into solution. This gas appeared to be primarily $CO_2$. However, small quantities of other gases, such as $SO_2$, $H_2O$, or $O_2$, may also be evolved. For example, analyses of the seeds in quenched samples generally indicated less than 1% $CO_2$.

As the temperature was increased further and the "dolomite" went into solution, the viscosity of the melt decreased. As the viscosity decreased, the bubbles began to rise to the surface and burst. The entrapped gases, including the small quantity of $CO_2$, were released at this time. For composition No. 16 this occurred at about 1250–1300° C. (2280–2370° F.). For higher viscosity compositions, it occurred at higher temperatures.

It was decided to compare the melting characteristics of dolomite-feldspar and soda-lime batches. Both samples were minus 100 mesh, but the weight of dolomite-feldspar sample used was about five times the weight of soda-lime sample used. Otherwise, the runs were identical.

As indicated by an effluent gas analysis, melting of the dolomite-feldspar sample began at about 1200° C. (2200° F.). Over 99.99% of the gas evolution was completed before melting began. The only gas detected after melting was the small quantity of $CO_2$ released as the bubbles burst at around 1270° C. (2318° F.).

Melting of the soda-lime batch began at around 800° C. (1470° F.). Even though a smaller sample was used, considerable gas evolution was observed long after melting began. Although both batches entrap furnace atmosphere as they initially melt down, considerable amounts of additional gases were evolved from the sample itself in the case of the soda-lime sample.

The limited observations made to date suggested that the dolomite-feldspar batch became "batch-free" at a lower temperature than the soda-lime batch used to make flint glass. Batch samples were heated at 1450° C. (2640° F.) for 10 minutes in air and quenched. Both samples were coarse grained (as received). The soda-lime sample still contained numerous grains of unmelted batch, while the dolomite-feldspar sample was much nearer being batch-free.

There were two features of the melting characteristics of dolomite-feldspar compositions which seemed important:

(1) Melting began at a relatively high temperature and was completed within a small temperature range.

(2) Almost all gas evolution was completed before melting began; consequently, the majority of the seeds consisted of entrapped furnace atmosphere.

These characteristics have several implications:

(1) The batch should flow easily up to relatively high temperatures since melting doesn't begin until about 1200° C. (2200° F.). This suggested the possibility of transferring "waste" heat directly to the batch. For example, an estimate based on DTA data indicated that 75% of the heat required to heat composition No. 16 to 1400° C. (2250° F.) was consumed below 1000° C. (1830° F.).

(2) Since melting occurred rapidly and no low-viscosity liquid was formed, there was little opportunity for "segregation" during melting.

(3) If entrapment of furnace atmosphere during melting could be avoided, little "refining" would be needed.

The inducing of surface stress in the glass of the present invention by potassium for sodium ion exchange to improve modulus of rupture was established. Although these samples represented wide ranges in oxide composition, a preliminary experiment involving all 49 glass samples was conducted.

Each sample was subjected to ionic exchange conditions by immersion of the glass in molten $KNO_3$. The potassium nitrate was held at 750° F. for a period of 20 hours. This preliminary experimentation indicated the ion exchange increased as the percent RO (CaO+MgO) decreased. Also, these data indicated that the CaO was more detrimental than the MgO.

On the basis of these exploratory results seven of the especially preferred glass compositions were selected for detailed study. These compositions represented glasses made from 90% feldspar or nepheline-syenite and 10% mixed calcite-dolomite limes. Unlike the preliminary studies which were made at 750° F., ionic exchange was conducted in molten $KNO_3$ at 850 and 1050° F. Two periods of time were used, namely, 15 minutes and 1 hour. This portion of the ion exchange investigation indicated that higher surface stresses were obtained at the higher temperatures. Also, the depth of ion exchange penetration increased at the higher temperatures.

On the basis of these results glass composition Example No. 39 was selected for more detailed studies. The specific purpose of this study was to determine the relationship between the depth and magnitude of the induced stress with time and temperature. During this specific ion exchange study the following times were utilized: ¼, ½, 1, 2 and 4 hours. Temperatures applied were 1000, 1050, 1100, 1150 and 1250° F. These temperatures were selected since temperatures above and below the strain point of the glass (1150° F.) were desired. Unlike the results obtained at the lower temperature interval, the magnitude of the resulting stress appears to decrease as the exchange temperatures increased. In general, the depth of stress was proportional to the square root of time. Also, stress depth increased as the temperature increased until the glass appeared to flow and accommodate the larger potassium ion. The depth in microns ($\mu$) and magnitude of the induced compressive stress in thousands of pounds per square inch (Mp.s.i.) are shown in Table II.

alumina content. Sample rods of this glass, without the colorant and thus a flint glass for container or bottle manufacture, after immersion in molten potassium nitrate at 750° F. for 18 hours had a surface compression of 8,000 p.s.i. and a compressive surface layer depth of 20 microns.

Various glass compositions of the preferred embodiment of the present invention were immersed in molten potassium nitrate at 750° F. for 20 hours, and the maximum compressive stress in the surface layer ranged from 2,000 to 28,000 p.s.i. with most of the values being above 10,000 p.s.i. In addition, almost all of the ion-exchanged glass rods had compressive stress surface layer depths of at least 40 microns. The best results were obtained when the alkaline earth aluminosilicate mineral was used in an amount of 90% of the batch as compared with the use of 80%.

The glasses of the preferred embodiment of the present invention, i.e., glasses having soda as the primary alkali metal oxide constituent, have been described above in considerable detail, but the glasses in which when potassia or lithia is the primary alkali metal oxide ingredient are within the scope of the present invention, as described earlier. In the case of the glass in which lithia is present in a substantial percentage of the alkali metal oxide content on a mole basis or is the predominant alkali metal oxide on a mole basis, one of natural lithium feldspars is used in the batch, and the lithium ions in the surface layer of the glass produced can be at least partially replaced by sodium ions or potassium ions at an elevated temperature below the strain point of the glass to provide a compressive stress surface layer, as is already described in the prior art in relationship to glasses of other compositions and made by processes other than the process of the present invention.

The predominant alkali metal ion in the surface layer of a glass of the present invention can be replaced by ion exchange with an alkali metal ion having a smaller ionic diameter using ion-exchangeable materials at an elevated temperature in contact with the glass in accordance with procedures already disclosed in the prior art. This is accomplished at an elevated temperature which can be below the strain point initially, but in such a case the product is heated to a temperature above the strain

TABLE II

| Temp. ° F. | ¼ hr. | | ½ hr. | | 1 hr. | | 2 hrs. | | 4 hrs. | |
| --- | --- | --- | --- | --- | --- | --- | --- | --- | --- | --- |
| | Mp.s.i. | $\mu$ | Mp.s.i. | $\mu$ | Mp.s.i. | $\mu$ | Mp.s.i. | $\mu$ | Mp.s.i. | $\mu$ |
| 1,000 | 26 | ¹26 | 14 | ¹30 | 23 | ¹34 | 37 | ¹50 | 36 | ¹68 |
| 1,050 | 15 | 21 | 22 | 48 | 19 | 72 | 26 | 80 | 27 | 90 |
| | 19 | ¹30 | 17 | ¹38 | 19 | ¹60 | 33 | ¹80 | 35 | ¹100 |
| 1,100 | 18 | 30 | 15 | 36 | 16 | 50 | 18 | 60 | 16 | 86 |
| | 26 | 25 | 19 | 40 | | | 11 | 83 | 19 | 100 |
| 1,150 | 11 | 35 | 12 | 35 | 10 | 68 | 6 | 95 | 9 | 130 |
| 1,250 | 3 | 30 | 3 | 80 | 2 | 55 | Nil | | Nil | |

¹ Exchange in $KNO_3$ bath; all others were exchanged in a eutectic mixture by weight of 32.8% NaCl and 67.2% $K_2SO_4$.

On the basis of these initial ion exchange studies it appeared that the best exchange conditions for glass composition No. 39 were 1000 to 1050° F. for 3–4 hours.

Various glasses of the preferred embodiment of the present invention, that are shown in Table I, have been subjected to ion exchange with potassium nitrate at 850 and 1050° F. for 15 minutes and 60 minutes. In addition, a glass made from a batch of 90% by weight Spruce Pine feldspar and 10% by weight magnesia has been ion exchanged with potassium nitrate at 1050° F. for 60 minutes. The latter glass had a compressive stress layer of 38 microns. The five-inch rods drawn from this glass in molten state, after the ion exchange, had an unabraded flexural strength of 79,800 p.s.i. After an abrasion with a blast of grit, rods of this ion-exchanged glass had a flexural strength or modulus of rupture of 25,600 p.s.i. which indicates a substantial retention of flexural strength.

Reissue U.S. Pat. No. 25,456 mentioned above shows a glass in Table III that contains 9.5% alumina. This is a glass made in the West coast using a sand with a high-point to heal any minor surface defects, before cooling. Ion exchange is preferably carried out at a temperature above the strain point but below the softening point of the glass.

The glass compositions, of the preferred embodiment at least, have liquidus temperatures that are low as compared with commercial aluminosilicate glasses. The glasses of the present invention, that are shown in Table I, have a log viscosity at the liquidus of at least 2.3 have a maximum of 2320° F., while those that have a log viscosity at the liquidus of at least 3.4 have a maximum liquidus temperature of 2215° F.

Various terms, such as "softening point" and "strain point," have been used. These terms are well known and thus require no definition in this application.

We claim:
1. A process for the manufacture of glass which comprises:
(1) forming a mixture consisting essentially of, as a major ingredient, at least one alkali aluminosilicate mineral selected from the group consisting of feldspars, aplite, nepheline syenite and mixtures thereof wherein the alkali is sodium, potassium or lithium and containing $Al_2O_3$ and $SiO_2$, and as a minor ingredient, at least one alkaline earth material in the form of a naturally occurring mineral selected from the group consisting of alkaline earth metal oxide, alkaline earth metal carbonate and alkaline earth aluminosilicate; said alkaline earth being selected from calcium, magnesium and mixtures thereof, wherein said major ingredient constitutes about 55% to about 90% by weight and said minor ingredient constitutes about 45% to about 10% weight based on the total weight of said ingredients less the weight of $CO_2$ of the carbonate content, if any, of said alkaline earth material;

(2) heating said mixture to an elevated temperature sufficiently high and for a sufficient time to form molten glass therefrom and to fine said molten glass; and (3) cooling said molten glass, said ingredients being used in amounts to provide by the process a glass having an oxide composition on a percent by weight basis as follows:

| | |
|---|---|
| $SiO_2$ | 51–63 |
| $Al_2O_3$ | 15–22 |
| CaO | 0–22 |
| MgO | 0–20 |
| Total CaO & MgO expressed as CaO mole equivalent | 10–22 |
| Total alkali metal oxide expressed as $Na_2O$ mole equivalent | 5–15 | and the log viscosity of the glass at its liquidus temperature is at least 2.3.

2. A glass article made by the process of claim 1 and which has formed on the surface thereof, a compressive stress surface layer and on a mole basis having a lower alkali metal ion content in said surface layer and a higher content of another alkali metal ion in said surface layer than in its inner portion.

3. A glass article made by the process of claim 1 and which has formed on the surface thereof, a compressive stress surface layer and on a mole basis having a sodium ion content in said surface layer and a higher content of potassium ion in said surface layer than in its inner portion.

4. The process of claim 1 wherein the amounts of said ingredients provide as the alkali metal oxide in the glass composition:

| | Percent by wt. |
|---|---|
| $Na_2O$ | 3.5–10 |
| $K_2O$ | 0–5 | and total $Na_2$ & $K_2O$, expressed as $Na_2O$ mole equivalent, is said 5–15% by weight.

5. The process of claim 1 wherein:
 (1) said alkaline earth material is chosen from oxide and carbonate and mixtures thereof; and
 (2) said major ingredient constitutes about 75% to about 90% by weight and said minor ingredient constitutes about 25% to about 10% by weight of said total weight of said mixture.

6. The process of claim 5 wherein said major ingredient constitutes about 80% to about 90% by weight and said minor ingredient constitutes about 20% to about 10% by weight of said total weight of said mixture.

7. The process of claim 1 wherein said alkali aluminosilicate is chosen from Spruce Pine feldspar, nephenline syenite, Western feldspar, aplite and mixtures thereof.

8. The process of claim 1 wherein said alkali aluminosilicate is Spruce Pine feldspar and the alkaline earth material is selected from high-calcite limestone, dolomite limestone and mixtures thereof.

References Cited

UNITED STATES PATENTS

| | | | |
|---|---|---|---|
| 2,779,136 | 1/1957 | Hood et al. | 65—30 XR |
| 3,146,114 | 8/1864 | Kivlign | 65—33 XR |
| 3,170,780 | 2/1965 | Takehara et al. | 65—33 XR |
| 3,282,770 | 11/1966 | Stookey et al. | 65—33 XR |
| 3,287,200 | 11/1966 | Hess et al. | 65—30 XR |
| 3,313,609 | 4/1967 | Megles | 65—33 |
| 3,365,314 | 1/1968 | Sack | 65—33 XR |
| 3,408,213 | 10/1968 | Provance et al. | 106—52 XR |

FOREIGN PATENTS

| | | |
|---|---|---|
| 707,705 | 4/1965 | Canada. |
| 6,501,168 | 8/1965 | Netherlands. |
| 6,411,555 | 6/1965 | Netherlands. |

FRANK W. MIGA, Primary Examiner

U.S. Cl. X.R.

65—30, 33; 106—52; 161—1

PO-1050
(5/69)

UNITED STATES PATENT OFFICE
CERTIFICATE OF CORRECTION

Patent No. 3,524,738      Dated August 18, 1970

Inventor(s) Everett F. Grubb, Erwin C. Hagedorn & Joseph R. Monks

It is certified that error appears in the above-identified patent and that said Letters Patent are hereby corrected as shown below:

Col. 3, line 2, "nepheine" should be --nepheline--; line 39, "aluminaum" should be --aluminum--. Col. 5, line 55, "feldspars" should be --feldspar,--; line 59, insert --(2)-- before "nepheline" (1st occurrence). Col. 6, line 17, "mixture" should be --mixtures--. Col. 7, line 2, "viscosityinpoisesatthetem" should be --viscosity in poises at that--. Col. 8, line 34, after "composition" insert a comma (,). Col. 9, after line 20, insert sentence --Glass made factor is 56.3%, as rest is $CO_2$ as carbonate.--; line 58, "mixture" should be --mixtures--. Col. 10, Table I, 2nd ingredient, "$Al_2O^3$" should be --$Al_2O_3$--; Table I, 4th Example column, 9th number, "6.12" should be --4.12--. Col. 11, Table I, Example 6, 1st number, "67.69" should be --47.69--; same Table, Example 9, 12th number, "2585" should be --2385--; same Table, Example 10, 19th number, "72." should be --72.3--; Example 11, 9th number, "1.68" should be --2.68--; Example 14, 16th number, "1529" should be --1520--; Example 18, 13th number, "2160" should be --2140--. Col. 12, Example 28, 6th number, "4.26" should be --4.24--. Col. 13, Table containing Examples 40-44, line 6 under oxide, "$K_3O$" should be --$K_2O$--; Example 44, 15th number, "1.685" should be --1,685--; Example 49, 12th number, "2590" should be --2570--. Col. 14, line 34, "200-mil." should be --200-ml.--; line 51, "starting" should be --start--. Col. 15, line 44, "example" should be --sample--. Col. 19, line 13, after "10%" insert --by--. Col. 20, line 7, "$Na_2$" should be --$Na_2O$--; line 21, "nephenline" should be --nepheline--.

Signed and sealed this 22nd day of May 1973.

(SEAL)
Attest:

EDWARD M. FLETCHER, JR.
Attesting Officer

ROBERT GOTTSCHALK
Commissioner of Patents